Patented Feb. 5, 1924.

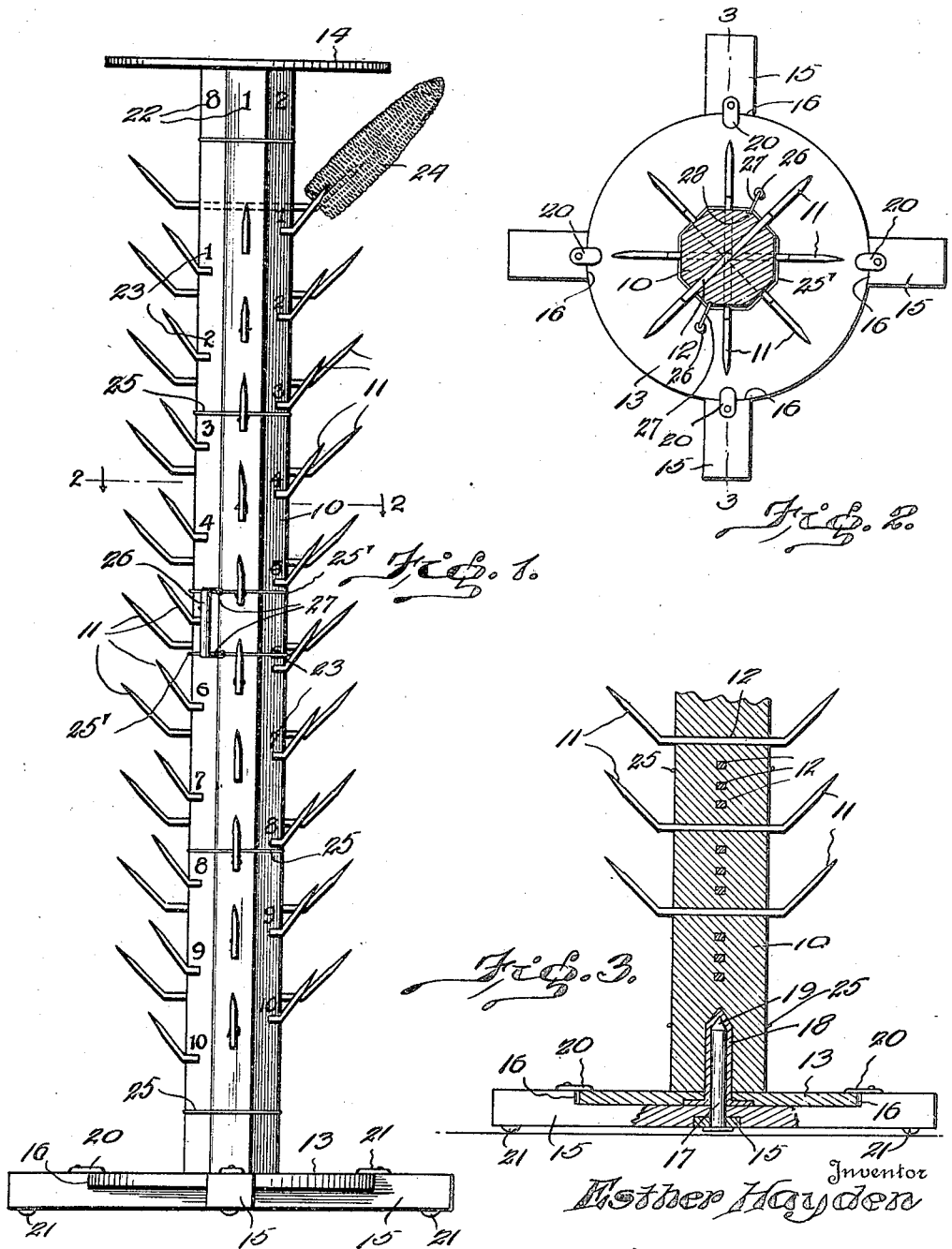

1,482,649

UNITED STATES PATENT OFFICE.

ESTHER HAYDEN, OF EAST JORDAN, MICHIGAN.

SEED-CORN RACK.

Application filed May 18, 1922. Serial No. 561,944.

*To all whom it may concern:*

Be it known that I, ESTHER HAYDEN, a citizen of the United States, residing at East Jordan, in the county of Charlevoix and State of Michigan, have invented certain new and useful Improvements in Seed-Corn Racks, of which the following is a specification, reference being had therein to the accompanying drawings.

This invention relates to seed corn racks and has for an object to provide a rack embodying new and improved features of convenience of operation, economy of manufacture and stability.

A further object of the invention is to provide a seed corn rack having indicia thereon from which and by means of which a record may be kept of the corn placed upon the rack.

With these and other objects in view the invention comprises certain novel parts, elements, units, combinations, constructions and functions, as disclosed in the drawings, together with equivalents thereof, as will be hereinafter more fully described and claimed.

In the drawings:

Figure 1 is a view of the device in side elevation;

Figure 2 is a horizontal transverse sectional view taken on line 2—2 of Figure 1;

Figure 3 is a vertical sectional view diametrically through the post, as indicated by line 3—3 of Figure 2.

Like characters of reference indicate corresponding parts throughout the several views.

The present invention is adapted for a variety of purposes, but is especially designed for and claimed as a rack for holding seed corn, and comprises a central post 10 of any desired or preferred material, but preferably of wood. The post 10 may be of any transverse shape and the showing of the same octagonal in the drawings is no limitation upon the shapes which may be employed within the scope of the present invention. When employed as an octagonal post it will preferably provide space for eight vertical series of impaling points 11 which will extend outwardly and inclined upwardly from the several sides of the posts. The showing of eight vertical series of impaling points is only to correspond with the octagonal shape of the posts and a greater or less number of series of impaling points is fully within the terms of the present application.

The impaling points 11 may be secured in the post in any approved or usual manner, here shown as being driven entirely through the post, as indicated at 12, so that the opposite ends of the members form oppositely positioned impaling points, but it is to be understood that the driving of these members through the post and forming the opposite points in this manner is no limitation upon the present invention and the impaling points may be secured within or upon the post in any usual or approved manner.

At the lower end the post is provided with a disk 13 of a diameter somewhat greater than the diametrical extent of the impaling points and at the upper end a disk 14, also of like diameter, is provided, both being preferably rigidly secured to the post and serving to protect the impaling points against damage or bending when the device is shipped in a box or laid upon the floor, or the like.

A foot member is provided comprising cross-bars 15 secured together in any usual well known manner, as by halving at the middle, and preferably provided with reduced portions formed by the shoulders 16 of substantially the same thickness as the disk 13, so that the disk 13 may set into and rest upon these reduced portions engaging at its periphery against or adjacent to the shoulders 16 and the top be substantially in a plane with the top of the cross-bars 15.

A pin 17 is rigidly secured to the foot, preferably extending upwardly through the cross of the members 15 and serves as a journal for the post 10 and disk 13 in any approved manner, as by providing the post with a thimble 18 and the pin 17 with a point 19, so that the post 10 with its disks 13 and 14 and the impaling points 11 is free to be rotated upon the pin 17 manually. To prevent accidental displacement latches 20 are provided, pivoted to the cross-bars 15 and swinging over the periphery of the disk 13 so that when lifting the device the foot lifts therewith. Castors or other supporting members 21 are supplied under the foot for the convenience of movement.

Also preferably a system of indexing is provided as for instance the use of numerals 22 to indicate certain sections or portions on the post 10, with other numerals 23 indicating the impaling points adjacent to which they are positioned. In this manner a record of the corn, one ear of which is indicated at 24, as impaled upon one of the points, may be kept so that the germination of the corn may be accurately determined as well as other characteristics or features relative thereto.

To prevent the impaling members 12 from becoming loosened or displaced from the post 10 by reason of splitting or cracking of the post, it is desirable that a plurality of bands 25 be employed to encircle the post. These bands 25 will preferably be in the form of wire, although it is, of course, understood that it is not so limited. It is also desirable to employ some of these bands, as the bands indicated at 25', for the purpose of attaching handles 26 to the post to carry the post when it is displaced from the foot or even with the foot attached should that be found desirable. These handle members 26 are shown in the drawing and will preferably be composed of wire loops 27 hooked about the wires 25' and seated in notches or depressions 28 formed in the post, as indicated more particularly at Figure 2.

What I claim to be new is:

1. A seed corn rack comprising a post having extending outwardly and upwardly therefrom a plurality of impaling points and disks rigidly and permanently secured to the opposite ends of the post having diameters greater than the diametrical extent of the impaling points.

2. A seed corn rack comprising a post, a plurality of impaling points extending outwardly from the post in diametrical planes and bent upwardly, disks rigidly and permanently secured to the ends of the post and having diametrical extents greater than the diametrical extent of the impaling points, a foot member, and means to mount the organization comprising the post and disks upon the foot member to permit rotation of the post and disks relative to the foot member.

3. A seed corn rack comprising a post, a foot comprising crossed bars having depressions formed therein, a disk rigidly and permanently secured to the post and seated and rotatable in the depressions of the foot, a second disk carried at the end of the post opposite the first-mentioned disk and of like diameter, and impaling points carried by and extending outwardly from the post to a circumference less than the circumferences of the disks.

In testimony whereof I hereunto affix my signature in presence of two witnesses.

ESTHER HAYDEN.

Witnesses:
J. A. HALL,
LESTER JERSEY.